(12) United States Patent
Ghosh et al.

(10) Patent No.: US 8,612,413 B2
(45) Date of Patent: Dec. 17, 2013

(54) DISTRIBUTED DATA CACHE FOR ON-DEMAND APPLICATION ACCELERATION

(75) Inventors: Arijit Ghosh, San Jose, CA (US); Vikas Garg, Saratoga, CA (US)

(73) Assignee: CDNetworks Co., Ltd., Seoul (KR)

( * ) Notice: Subject to any disclaimer, the term of this patent is extended or adjusted under 35 U.S.C. 154(b) by 85 days.

(21) Appl. No.: 12/855,606

(22) Filed: Aug. 12, 2010

(65) Prior Publication Data

US 2012/0041970 A1 Feb. 16, 2012

(51) Int. Cl.
*G06F 17/30* (2006.01)

(52) U.S. Cl.
USPC ........... 707/706; 707/610; 707/688; 707/791; 707/802

(58) Field of Classification Search
USPC .......................................... 707/721, 600–899
See application file for complete search history.

(56) References Cited

U.S. PATENT DOCUMENTS

| | | | |
|---|---|---|---|
| 7,127,713 B2 | 10/2006 | Davis et al. | |
| 7,254,634 B1 | 8/2007 | Davis et al. | |
| 7,590,739 B2 | 9/2009 | Swildens et al. | |
| 2004/0133538 A1* | 7/2004 | Amiri et al. | 707/1 |
| 2007/0203890 A1* | 8/2007 | Sareen et al. | 707/3 |
| 2009/0222583 A1* | 9/2009 | Josefsberg et al. | 709/245 |
| 2009/0248893 A1* | 10/2009 | Richardson et al. | 709/239 |
| 2010/0211983 A1* | 8/2010 | Chou | 725/93 |
| 2012/0150992 A1* | 6/2012 | Mays et al. | 709/217 |

\* cited by examiner

*Primary Examiner* — Isaac M Woo
(74) *Attorney, Agent, or Firm* — Fenwick & West LLP

(57) ABSTRACT

A distributed data cache included in a content delivery network expedites retrieval of data for application execution by a server in a content delivery network. The distributed data cache is distributed across computer-readable storage media included in a plurality of servers in the content delivery network. When an application generates a query for data, a server in the content delivery network determines whether the distributed data cache includes data associated with the query. If data associated with the query is stored in the distributed data cache, the data is retrieved from the distributed data cache. If the distributed data cache does not include data associated with the query, the data is retrieved from a database and the query and associated data are stored in the distributed data cache to expedite subsequent retrieval of the data when the application issues the same query.

21 Claims, 10 Drawing Sheets

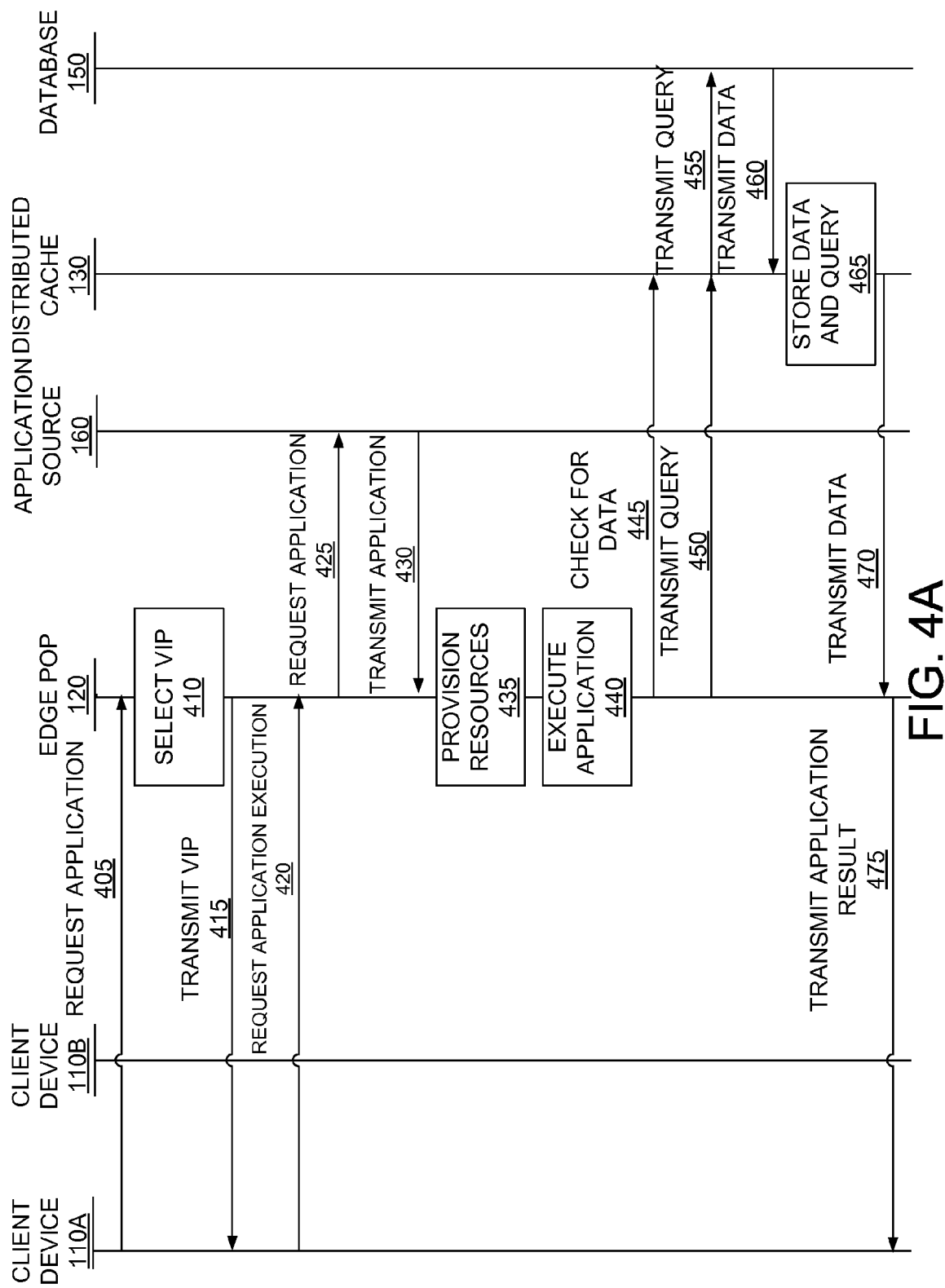

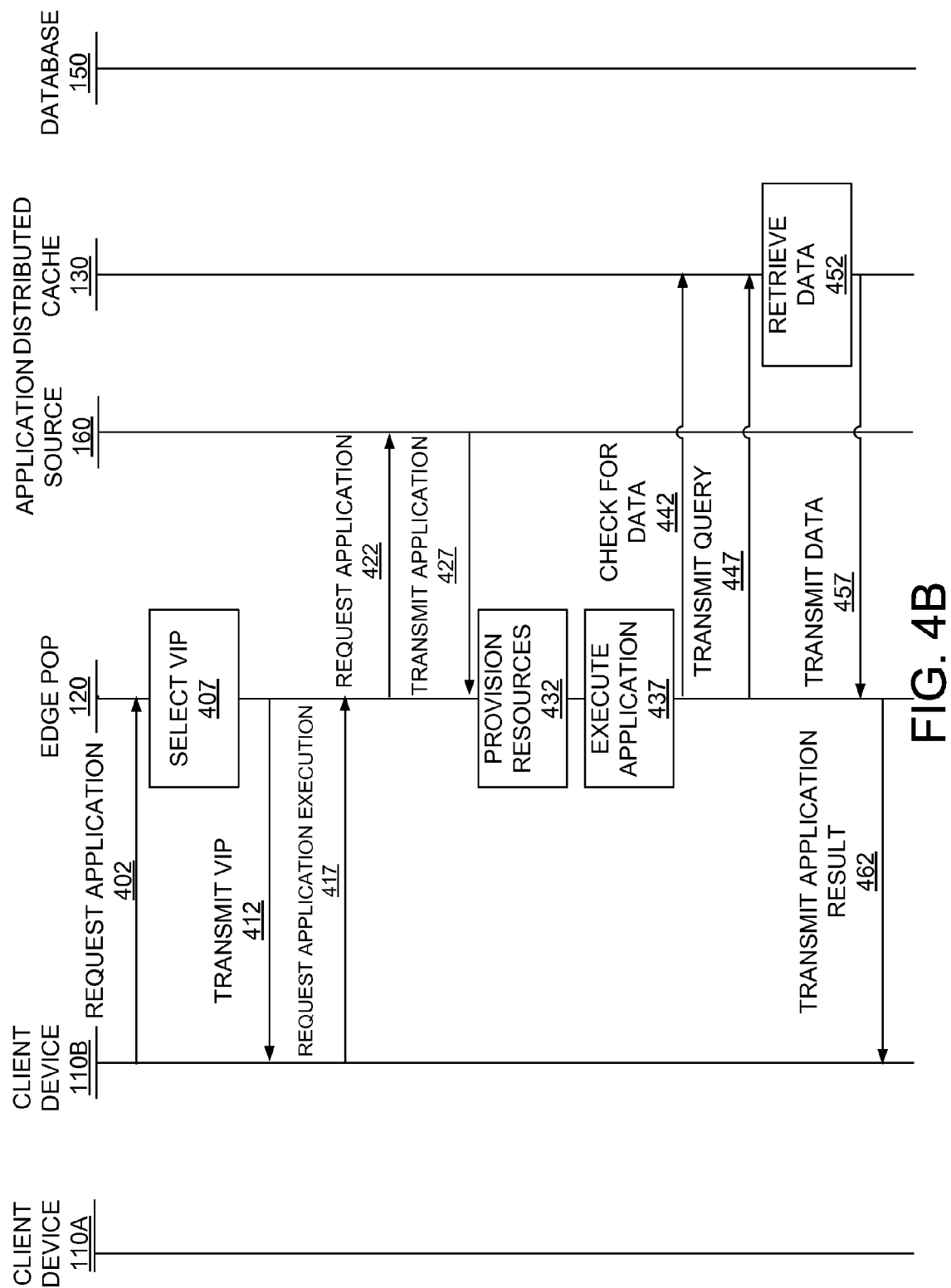

DISTRIBUTED DATA CACHE FOR ON-DEMAND APPLICATION ACCELERATION

BACKGROUND

1. Field of the Invention

The present invention relates to application execution in a content delivery network and, in particular, to accelerating retrieval of data for an application executed by a server in the content delivery network.

2. Description of the Related Art

Distributed software products and business applications operated by multiple computing devices connected by a network, such as the Internet, are becoming increasingly common. Typically, distributed operation of an application involves three primary entities connected by a network, the user, the computing platform executing the application, which may include multiple computing devices, and a database storing data used by the application. Multiple factors should be optimized to accelerate execution of a distributed application. In particular, the network latency between the user and the computing device executing the application and the network latency between the computing device executing the application and the database should be optimized. Further, optimizing dynamic provisioning of computing resources across the network for scalability and performance also expedites execution of a distributed application. However, conventional techniques for distributed application execution only optimize a subset of the above-identified factors, limiting application execution using conventional techniques.

For example, conventional cloud computing approaches to executing distributed applications generally provision resources in a data center to an application so that performance and scalability are optimized; however, conventional cloud computing approaches typically do not optimize network latencies between the user and the computing system executing the application or between the computing device executing the application and the database. Other techniques for distributed application execution select the computing device for execution of the application based on application-specific needs, but do not account for latency between the computing device executing the application and the database. While some approaches to distributed application execution export data using a database or a file that is communicated to the computing device executing the application, when the application data changes, an updated version of the database or the file must be generated and communicated to the computing device executing the application. Until the computing device executing the application receives the updated database or file, the application may be working with outdated, or incorrect, data.

Alternative techniques for execution of distributed applications attempt to minimize network latencies between the user and the computing device executing the application and between the computing device executing the application and the database. However, these techniques do not allow selection of the optimal device in the network that is able to most efficiently execute the application. Because conventional techniques for distributed application execution merely optimize a subset of the factors influencing application execution, these conventional techniques reduce the speed with which distributed applications are executed.

SUMMARY

According to various embodiments, the time to retrieve data used by an application executed by a server within a content delivery network is reduced by including a distributed data cache in the content delivery network. The distributed data cache is distributed across computer-readable storage media included in a plurality of servers in the content delivery network. While the distributed data cache is distributed across multiple servers, applications access the distributed data cache as if accessing a single logical entity. When an application executed by a server in the content delivery network generates a query for data, it is determined whether the distributed data cache includes data associated with the query. For example, a server in the content delivery network, which may be the server executing the application or a different server, determines whether the distributed data cache includes data associated with the query. In one embodiment, the server applies a hash function to the query and uses the resulting hash value to identify a server and a location within a computer-readable storage medium within the server to check for data. If the identified location in the distributed data cache includes data associated with the query, data is retrieved from the distributed data cache and communicated to the server executing the application. However, if the location in the distributed data cache does not include data associated with the query, the query is communicated to a database and data is retrieved from the database. The query and associated data retrieved from the database are then stored in the identified location in the distributed data cache to expedite subsequent retrieval of the data when the application subsequently issues the same query. By storing data in the distributed data cache, the number of times data is retrieved from the database is reduced, beneficially decreasing application execution by reducing the frequency with which data is transmitted from the database to the server executing the application.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 4A is an interaction diagram illustrating use of a distributed cache in a CDN for initial data retrieval for an executing application in accordance with an embodiment of the present invention.

FIG. 4B is an interaction diagram illustrating use of a distributed cache in a CDN for retrieval of previously accessed data for an executing application in accordance with an embodiment of the present invention.

DETAILED DESCRIPTION OF EMBODIMENTS

Figure 1:
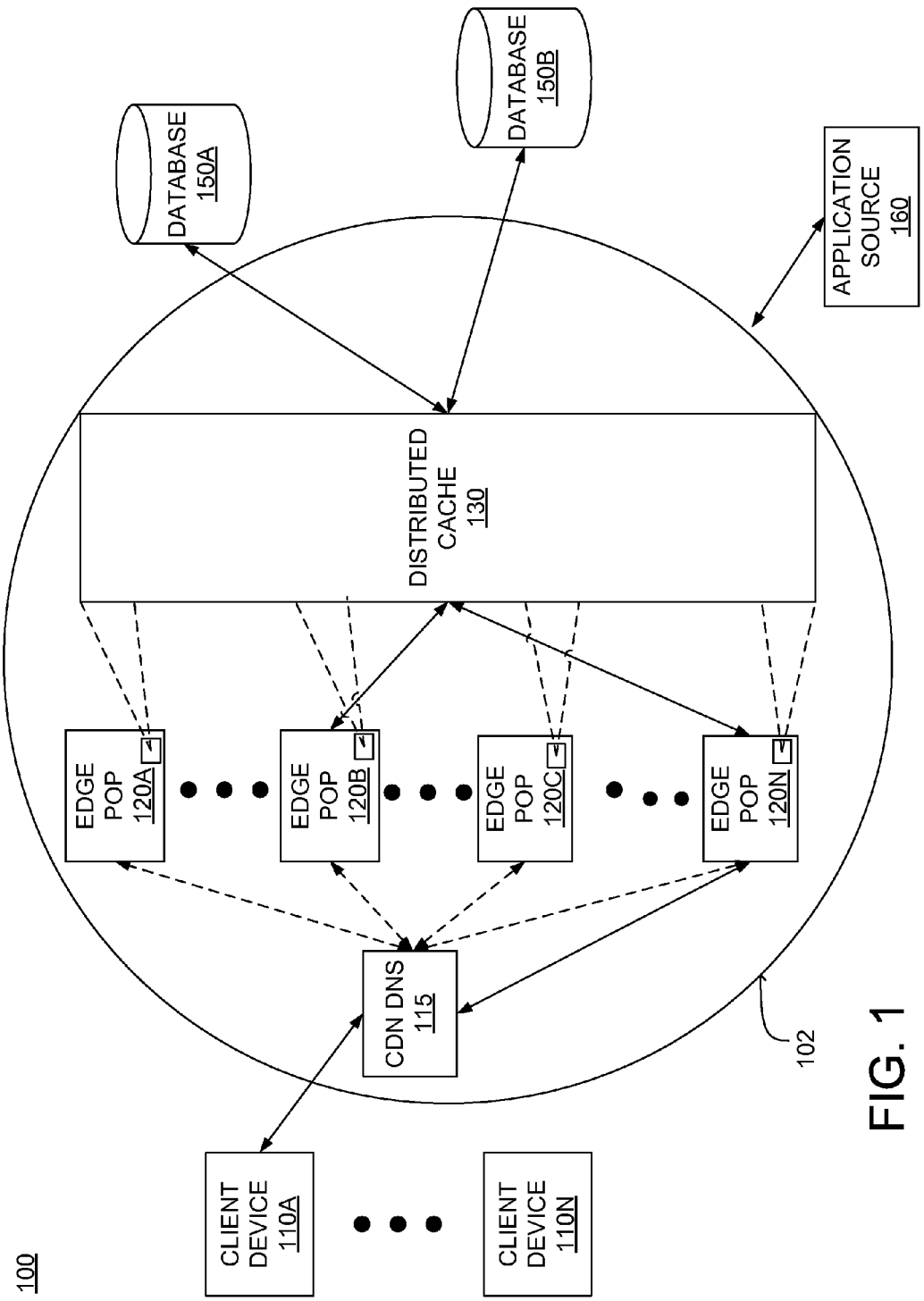
FIG. 1 illustrates the overall architecture of a content delivery network (CDN) in accordance with an embodiment of the present invention.

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention. Like reference numerals are used in the figures to identify like elements.

Reference will now be made in detail to several embodiments of the present invention(s), examples of which are illustrated in the accompanying Figures. It is noted that wherever practicable similar or like reference numbers may be used in the figures and may indicate similar or like functionality. The Figures depict embodiments of the present invention for purposes of illustration only. One skilled in the art will readily recognize from the following description that alternative embodiments of the structures and methods illustrated herein may be employed without departing from the principles of the invention described herein.

In general, embodiments of the present invention improve execution time of distributed applications executed using a content delivery network (CDN), which includes a distributed network of edge points of presence (edge POPs) comprising physical locations where copies of data or files are cached. Client devices, such as desktop or laptop computers, communicate a request to execute an application to an edge POP, which retrieves the application from an application source, such as an origin server. The retrieved application is executed on a host system running on a server within an edge POP via a virtual Internet Protocol address (VIP), or other suitable virtual network address. As the application is executed, data is retrieved from a database and manipulated by the application. To reduce network latency in data retrieval, a distributed data cache stores queries sent to a database and the corresponding data returned by the database. Hence, previously retrieved data is retrieved from the distributed data cache rather than from the database.

The distributed data cache stores data in multiple computer-readable storage media in multiple servers. In one embodiment, the servers are included in multiple edge POPs. Cache managers executed in various edge POPs communicate data and queries for data between different edge POPs, allowing the distributed data cache to appear as a single logical entity to executing applications. In one embodiment, when an executing application generates a query requesting data, a cache manager applies a hash function to the query and uses the resulting hash value to determine a location in the distributed data cache from which data is retrieved. Each cache manager uses the same hash function to identify the same location in the distributed data cache for a query. Because the distributed data cache stores previously received queries and data retrieved from a database in response to the query, the distributed data cache expedites execution of an application by reducing the time for retrieving data from a database.

Architectural Overview of a Content Delivery Network (CDN)

FIG. 1 illustrates the overall architecture of a system 100 for executing distributed applications using a content delivery network (CDN) 102 in accordance with one embodiment of the present invention. A CDN 102 comprises various data centers referred to herein as edge points of presence (edge POPs) 120A, 120B, 120C, 120N (individually or collectively also referred to with reference numeral 120) that are placed at various points in the network (e.g., the Internet) and store copies of data for access by client devices 110A, 110B (individually or collectively also referred to with reference numeral 110). While the example of FIG. 1 shows four edge POPs 120A, 120B, 120C, 120N, other embodiments of the CDN 102 may include a greater or fewer number of edge POPs 120. An edge POP 120 may also execute an application identified by a client device 110 and communicate data from the application to the client device 110. In one embodiment, an edge POP 120 obtains the application for execution from an application source 160. While FIG. 1 depicts the application source 160 as distinct from the edge POPs 120A, 120B, 120C, 120N to illustrate a logical distinction between the application source 160 and the edge POPs 120A, 120B, 120C, 120N, the application source 160 may be an edge POP 120 itself or may be a separate source of data, such as an origin server provided by an enterprise using the services of the CDN 102.

When executing an application, an edge POP 120 may retrieve data from one or more databases 150A, 150B (individually or collectively also referred to with reference numeral 150). The databases 150 may be external data sources coupled to the CDN 102, or they may be included in one or more edge POPs 120A, 120B, 120C, 120N within the CDN 102, although the databases 150 are assumed to be at least external to the server in the edge POP 120 at which the application is running Similar to the application source 160, FIG. 1 depicts the databases 150A, 150B as distinct from the edge POPs 120A, 120B, 120C, 120N to illustrate a logical distinction between the components. Further, while FIG. 1 shows two databases 150A, 150B in other embodiments, a greater or smaller number of databases 150 may be included in the system 100.

In one embodiment, the CDN 102 also includes a CDN domain name system (DNS) 115 which periodically receives latency measurements from one or more probes included in various edge POPs 120A, 120B, 120C, 120D. For example, each edge POP 120 may receive data from various probes that measures the latency and network distance between the client devices 110 and each edge POP 120, and the CDN DNS 115 may receive such latency and network distance information from the various edge POPs 120. While CDN DNS 115 is illustrated as being physically separate from the edge POPs 120, the CDN DNS 115 may also be part of one or more of the edge POPs 120. The CDN DNS 115 may use these latency measurements to determine an edge POP 120A, 120B, 120C, 120N that should receive a request for application execution from a client device 110A, 110B. For example, the CDN DNS 115 receives a request to execute an application from a client device 110A and identifies an edge POP 120N having a minimum latency or having a latency below a threshold value. This allows the CDN DNS 115 to identify an edge POP 120N that provides the most rapid execution of the requested application. In some embodiments, the selection of the edge POP 120N for application execution may be based on other criteria, for example, the load on the servers in the edge POPs 120, network congestion, or monetary cost of using different edge POPs 120A, 120B, 120C, 120N. After the CDN DNS 115 identifies an edge POP 120N, the client 110A sends a subsequent request for executing an application directly to the identified edge POP 140N and receives data from the application via the edge POP 140N.

Upon receiving a request to execute an application, a server in the identified edge POP 120 identifies an application source 160 and retrieves the requested application from the application source 160. The server in the identified edge POP 120 stores the received application and any additional received data to expedite local execution of the application in response to additional requests. As the application is executed by the server in the identified edge POP 120, the application may generate queries requesting data from one or more databases 150A, 150B. To reduce the latency in retrieving data from a database 150, the CDN 102 includes a distributed data cache 130 which stores queries from applications and retrieved data associated with the queries. In one embodiment, a cache manager, further described below in conjunction with FIG. 2B, initially determines whether the distributed data cache 130 includes data requested by a query. If the distributed data cache 130 includes the requested data, the associated data is retrieved from the distributed data cache 130. However, if the distributed data cache 130 does not include the requested data, the data is retrieved from a database 150A, 150N and stored in the distributed data cache 130 along with the associated query to simplify subsequent retrieval of the data in response to the same query by the application. Operation of the distributed data cache 130 is further described below in conjunction with FIGS. 4A, 4B and 5.

By partitioning the distributed data cache 130 across multiple edge POPs 120, access to the distributed data cache 130 from client devices 110 in different locations is simplified. Additionally, distribution across multiple edge POPs 120 allows the size of the distributed data cache 130 to be more readily increased. Additionally, retrieving data for applications from the distributed data cache 130 reduces the load on the databases 150, which reduces the monetary investment in hardware for database 150 implementation.

To more clearly illustrate the logical distinction between the edge POPs 120A, 120B, 120C, 120N and the distributed data cache 130, FIG. 1 shows the distributed data cache 130 as a distinct element. However, as noted above, the distributed data cache 130 is physically distributed across multiple servers of multiple edge POPs 120A, 120B, 120C, 120N, so that various edge POPs 120A, 120B, 120C, 120N store different portions of the distributed data cache 130. Thus, a portion of one or more storage devices, or other computer-readable storage media, included in various edge POPs 120A, 120B, 120C, 120N stores queries and data responding to queries, increasing the reliability of the CDN 102.

Figure 2A:
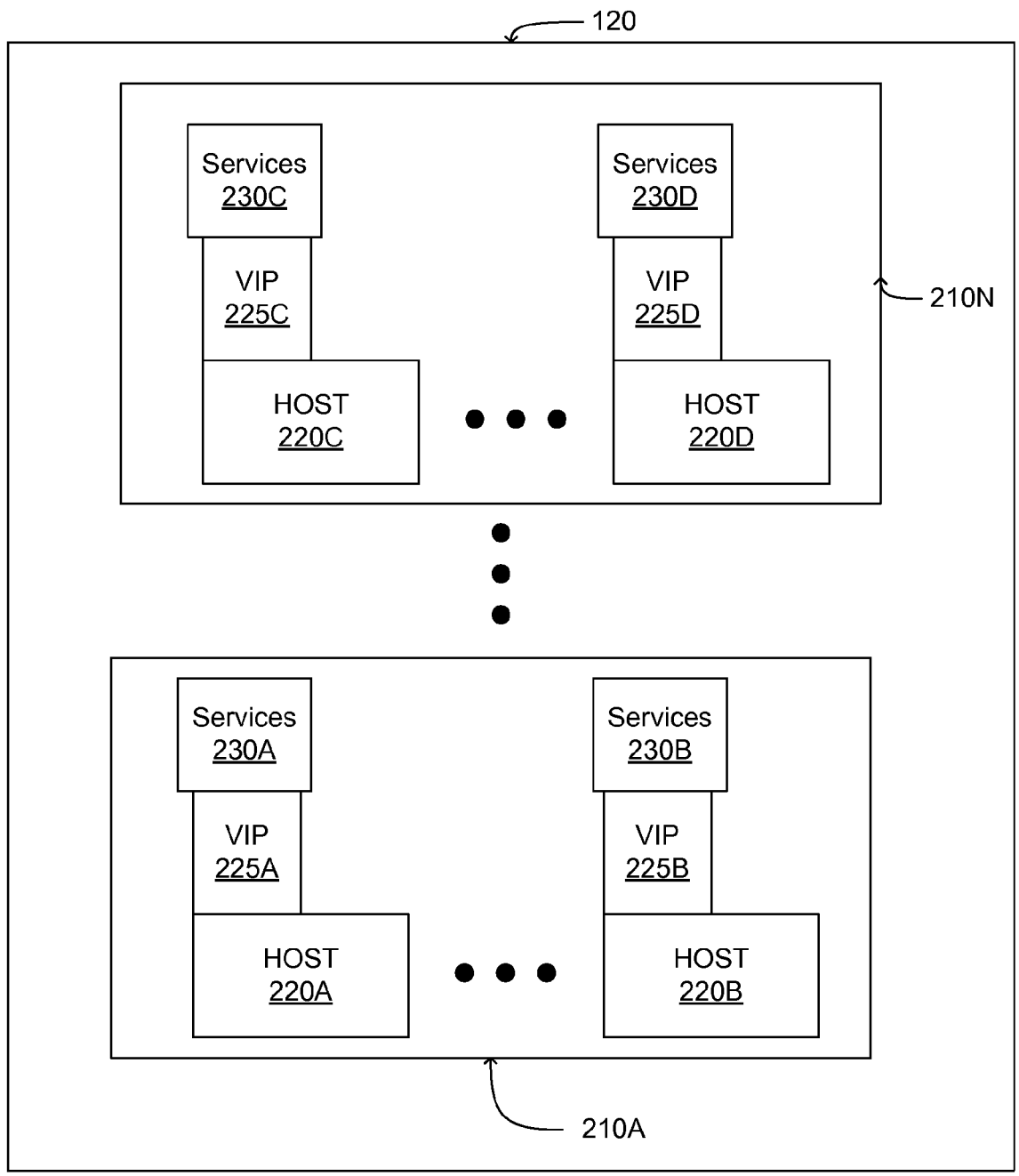
FIG. 2A illustrates the architecture of an edge point of presence (POP) in accordance with an embodiment of the present invention.

FIG. 2A illustrates the architecture of an edge POP 120 in a CDN 102. Each edge POP 120 includes multiple servers 210A, 210N. For purposes of illustration, FIG. 2A depicts two servers 210A, 210N (individually or collectively also referred to with reference numeral 210) in an edge POP 120. Each server 210 is a computing device having one or more processors and one or more storage devices, or other computer readable storage media, so that a server 210 has data storage and data processing functionality. The one or more processors in each server 210 execute instructions or other executable code form a computer-readable storage medium to implement one or more hosts 220A, 220B, 220C, 220D (individually or collectively also referred to with reference numeral 220). In one embodiment, each of the hosts 220A, 220B, 220C, 220D is a virtual machine (VM) running on the servers 210, so implementing multiple hosts 220 allows a server 210 to emulate operation of multiple types of computing devices. The hosts 220A, 220B, 220C, 220D read data from one or more storage devices or write data to a storage device of the servers 210. For purposes of illustration, FIG. 2A shows server 210A implementing two hosts 220A, 220B and server 210B implementing two hosts 220C, 220D; however, in other embodiments each server 210A, 210B may implement a greater or lesser number of hosts 220. The architecture of a server 210 is further described below in conjunction with FIG. 7.

Each VM host 220 includes one or more virtual Internet Protocol addresses (VIPs) 225, or other virtual network addresses, through which one or more services 230A, 230B, 230C, and 230D (individually or collectively also referred to with reference numeral 230) are executed on the VM host 220, further described below in conjunction with FIG. 2B, manipulating stored data or received data. The VIPs 225 allow a network interface included in the server 210 to transmit and receive data using multiple IP addresses. For illustration, FIG. 2A shows a single VIP 225A, 225B, 225C, 225D included in each host 220A, 220B, 220C, 220D; however, in various embodiments, each host 220A, 220B, 220C, 220D may include a larger number of VIPs 225 and each host may include a different number of VIPs 225. Using VIPs 225 to execute services 230 such as applications on the VM hosts allows more efficient use of server 210 resources.

Figure 2B:
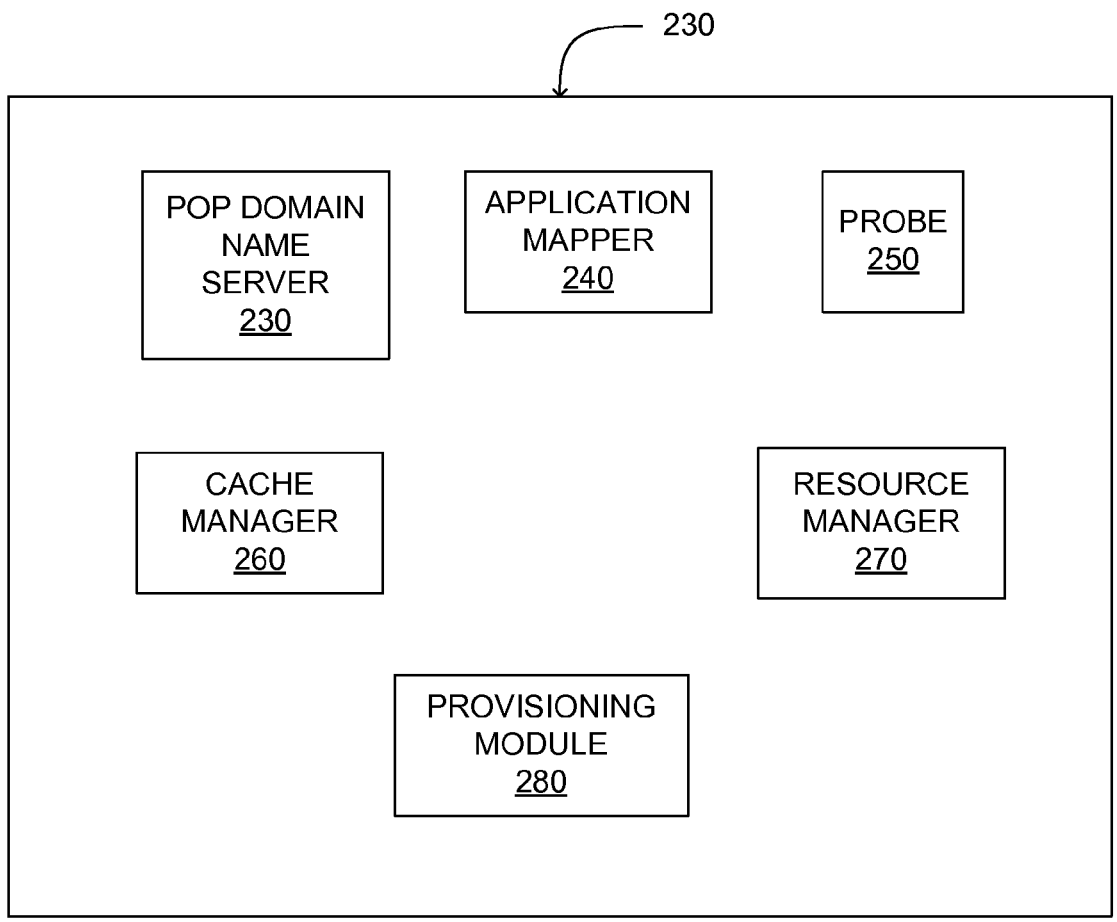
FIG. 2B illustrates services executed by a server of an edge POP in accordance with an embodiment of the present invention.

FIG. 2B illustrates examples of services 230 that are executed via the VIPs 225 on the hosts 220 of a server 210. In one embodiment, the services 230 include a POP domain name server 230, an application mapper 240, a probe 250, a cache manager 260, a resource manager 270 and a provisioning module 280. However, in other embodiments, different and/or additional services may be implemented to run via a VIP 225 of a host 220.

When a server 210 in an edge POP 120 receives a request to execute an application, the POP domain name server (DNS) 230 executes a load balancing algorithm to identify a subset of VIPs 225 in one or more edge POPs 120 that optimize one or more criteria, such as server 210 resource usage, as further described below. A VIP 225 via which the requested application is to be executed is then selected from the identified subset of VIPs 225, as further described below. In one embodiment, the POP DNS 230 service is executed on the servers 210 of multiple edge POPs 120. Each POP DNS 230 receives data describing the status of multiple VIPs 225 from multiple servers 210 in multiple edge POPs 120. For example, the POP DNS 230 receives data describing the status of all VIPs 225 in all edge POPs 120 and may also receive data describing the status of a network connecting various edge POPs 120 with each other and with the client devices 110. To identify the subset of VIPs 225, the POP DNS 230 accounts for one or more criteria, such as the status of VIPs 225 within the edge POP 120, the processor load of servers 210 including VIPs 225, memory availability of servers 210 including VIPs 225, disk space of servers 210 including VIPs 225 and open network connections of servers 210 including VIPs 225, the network distance between various edge POPs 120 and the client device 110 requesting application execution, the bandwidth available to various servers 210, the availability of various POPs 120 and/or packet loss characteristics. In one embodiment, the POP DNS 230 receives the data describing VIP 225 status, POP 120 status and/or network status from one or more probes 250, which are further described below. The POP DNS 230 may also use additional criteria when identifying a subset of VIPs 225 to use for application execution. For example, the POP DNS 230 may account for business reasons or operational reasons when identifying the subset of servers.

The probe 250 measures the load on various servers 210 including VIPs 225 and network status to monitor the state of the various servers 210 and the availability of multiple VIPs 225. In one embodiment, the probe 250 determines server 210 load by determining processor usage, memory usage, available storage space and number of network connections of a server 210 including one or more VIPs 225; however, in other embodiments, the probe 250 may determine different and/or additional data to determine server 210 load. In one embodiment, the probe 250 also determines network status by measuring network distance and bandwidth between edge POPs 120 including VIPs 225 and client devices 110, and reports the measured latency and bandwidth to one or more POP DNS' 230. In one embodiment, a probe 250 primarily monitors a single edge POP 120; however, a probe 250 may monitor multiple edge POPs 120 to provide fault tolerance for VIP 225 monitoring.

The resource manager 270 captures data from different servers 210 describing application-level resource usage of different servers 210 by capturing data characterizing applications executed on the servers 210 via various VIPs 225. In one embodiment, each server 210 includes a resource manager 270. The resource manager 270 may use different characterizations to describe use of server 210 resources by applications executing on a server 210. For example, the resource manager 270 may determine whether an executing application is computationally intensive or uses specialized instructions, whether an application frequently accesses storage devices and/or a frequency with which an application communicates with outside entities, such as other applications, other systems or other client devices 110. Identifying application-level resource usage of a server 210 allows the resource manager 270 to generate a status map describing how different applications use server 210 resources. Hence, the probe 250 captures data describing usage of server 210 resources at the system level, accounting for how multiple applications use server 210 resources, while the resource manager 270 captures data describing use of server 210 resources at the application level.

An example operating scenario illustrates use of the status map generated by the resource manager 270. In the example scenario, server 210A executes a first application that is computationally intensive and infrequently engages in high volume network communication via a VIP 225A. Data captured by a probe 250 merely indicates that network usage by the server 210A is generally low, with occasional spikes. An edge POP 120 then receives a request to execute a second application that infrequently uses network resources, but needs to ensure that its required network resources are available when needed. Based on data from the probe 250, VIP 225A would be selected via which to execute the second application on server 210A. However, when the first application engages in high volume network communication, execution of the second application via VIP 225A is impaired. Because data maintained by the resource manager 270 indicate how various applications use resources, the resource manager 270 describes how both the first application and the second application use server 210A resources over time. This allows identification of a different VIP 225 (potentially on a different server 210) via which the second application should be executed, improving performance of the second application.

The application mapper 240 uses data from the resource manager 270, the probe 250 and the POP DNS 230 to select a VIP 225 of a particular server 210 via which to execute an application from the subset of VIPs 225 identified by the POP DNS 230. To identify a VIP 225 via which to execute an application, the application mapper 240 balances the cost of using a VIP 225 against the application performance when the VIP 225 is used. In one embodiment, the application mapper 240 associates a score with each VIP 225 in the subset of VIPs 225. For example, the application mapper 240 generates a VIP-specific score based on one or more of: availability of application-specific resources to a VIP 225, general computing or network resources available to a VIP 225, execution characteristics of applications executed via a VIP 225, execution characteristics of the application to be executed, the cost of executing multiple applications using a VIP 225 and/or the cost of provisioning a VIP 225 for initial application execution. In other embodiments, different data may be used by the application mapper 240 to associate a score with each VIP 225 in the subset of VIPs 225. Using the calculated scores, the application mapper 240 identifies a VIP 225 through which to execute an application on the associated server 210. Since the VIP 225 is associated with a host 220 running on a particular server 210 of a particular edge POP 120, selection of a particular VIP 225 via which the application should be executed essentially results in selection of a particular edge POP 120, a particular server 210 of the particular edge POP 120, a VM host 220 of the particular server 210 and the VIP 250 of that particular VM host 220 via which the application is to be executed. One embodiment of a method for VIP 225 selection by the application mapper 240 is further described below in conjunction with FIG. 6.

The provisioning module 280 allows a server 210 to more efficiently execute multiple applications using one or more VIPs 225. Conventional approaches for using a server 210 to execute multiple applications rely on using multiple hosts 220, such as multiple virtual machines, within a server to each execute applications in different operating environments, consuming significant resources and operating time for configuring and maintaining the various hosts 220. In contrast, the provisioning module 228 allows a server 210 to receive a virtualized instance of an application including executable files and data files, such as system libraries, used by the application during execution and allows a host 220 within the server 210 to execute the virtualized instance of the application and direct operations of the virtualized instance of the application to a virtual resource. Rather than require use of multiple hosts 220 to simulate different operating environments, the provisioning module 280 allows a single host 220 to execute various types of applications using virtualized resources within the host 220. The provisioning module 280 configures the virtualized resources within the hosts using the data files included in the virtualized instance of an application. Additionally, the provisioning module 280 may remove applications, such as a least recently used application or a least frequently used application, to provide additional resources for execution of a virtualized instance of an application.

In one embodiment, the cache manager 260 is executed on the servers 210 of various edge POPs 120 and receives queries for information from a database 150 generated during application execution. Because the distributed data cache 130 is often distributed across multiple servers 120 in one or more edge POPs 120, the cache manager 260 creates a single logical view of the distributed data cache 130, simplifying data retrieval from the distributed data cache 130 by allowing applications to retrieve data as if retrieving data from a single cache. When an executing application queries a database 150 for information, the query is communicated to the cache manager 260, which determines a location in the distributed data cache 130 associated with the query. For example, the cache manager 260 applies a hash algorithm to a query and uses the resulting hash value to identify a location in the distributed data cache 130 from which data for responding to the query is retrieved. Hence, the cache manager 260 uses the query to determine a location in the distributed data cache 130 to access. If the identified location in the distributed data cache 130 does not include data requested by the query, the cache manager 260 transmits the query to a database 150 and stores data received from the database 150 together with the query in the identified location in the distributed data cache 130 while communicating the data to the requesting application. Storing the data and the query in the distributed data cache 130 allows the cache manager 260 to subsequently retrieve data for the same query from the distributed data cache 130, reducing application execution time while reducing the load on the database 150. The information in the cache managers 260 of the various edge POPs is shared and synchronized among the various cache managers 260 of the various edge POPs, so that each cache manager 260 has the same information on the locations in the data cache 130 where queries and their corresponding data are stored.

The cache manager 260 also deletes data in the distributed data cache 130 as needed and modifies a database 150 when an application writes data. In one embodiment, when the distributed data cache 130 is full and a new query is received, the cache manager 260 deletes the least recently used pairing of a query and data. However, in other embodiments, the cache manager 260 may use an alternative policy for removing data, such as removing the least frequently used pairing of query and data.

Different policies may be used by the cache manager 260 to update a database 150 when an application writes data. For example, if an application operates using atomicity, consistency, isolation and durability (ACID) properties with data in the database 150, the cache manager 260 synchronizes data written by the application with the database 150 when the data is written by the application to the distributed data cache 130. If an application does not use ACID properties, the cache manager 260 modifies the pairing of query and data in the distributed data cache 130 and communicates the modified data to the database 150 when the pairing of query and data is removed from the distributed data cache 130. Thus, the cache manager 260 deletes an identified pairing of query and modified data and writes the modified data back to the database 150. In one embodiment, the cache manager 260 also includes a time limit, so data is synchronized between the distributed data cache 130 if data in the distributed data cache 130 is not modified within the time limit.

Operation of Distributed Data Cache and Cache Manager

Figure 3:
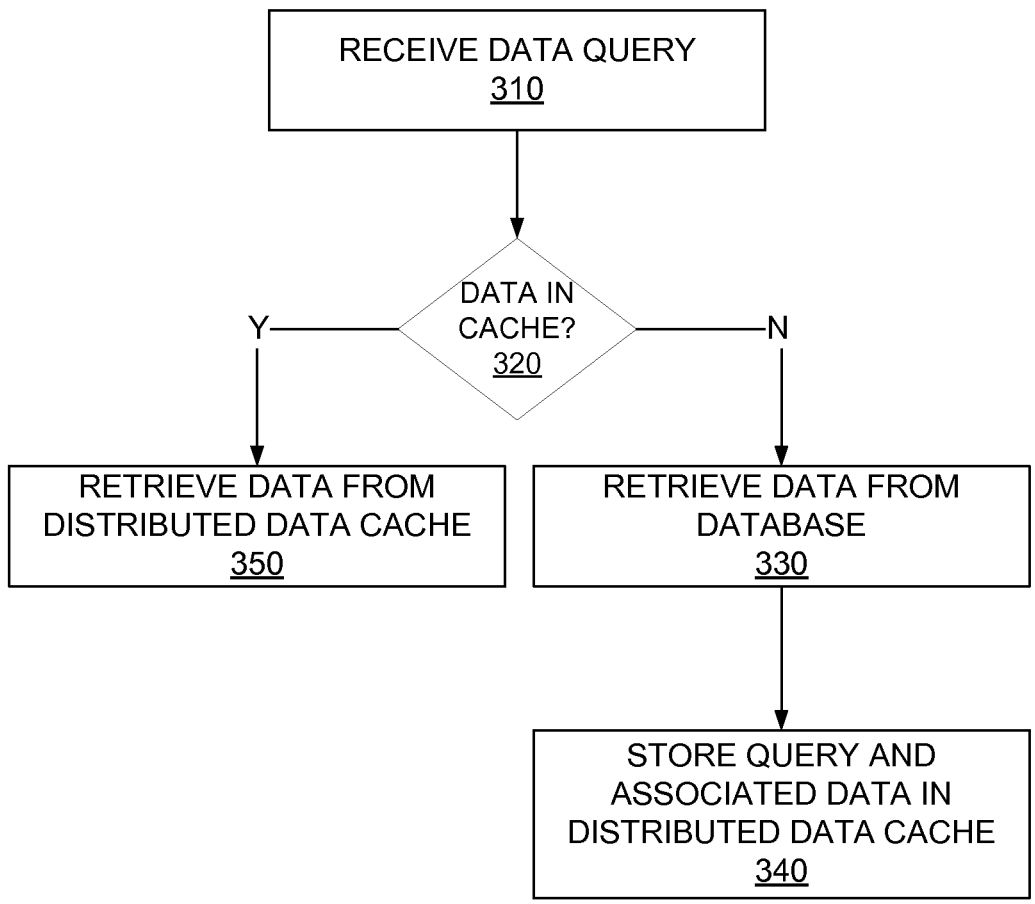
FIG. 3 is a flow chart illustrating a method of data retrieval for an application executed in a content delivery network (CDN) in accordance with an embodiment of the present invention.

FIG. 3 is a flow chart of one embodiment of a method 300 for retrieving data for execution of an application in a content delivery network (CDN) 102 in accordance with an embodiment of the present invention. When an application executed via a virtual Internet Protocol (VIP) 225, or other virtual network address, of a host 220 generates a query to retrieve data from a database 150, a cache manager 260 running on a server 210 receives 310 the query. In one embodiment, the cache manager 260 and application may be executed on the same VIP 225. Alternatively, the cache manager 260 and application may be executed on different VIPs 225 distributed across hosts 220 running on different servers 210.

The cache manager 260 then determines 320 whether the distributed data cache 130 includes data associated with the query. In one embodiment, the cache manager 260 applies a hash function to the received query and determines 320 whether a location in the distributed data cache 130 identified by the resulting hash value includes a pairing of the query and associated data. Note that the same hash function is used in the cache managers 260 running on all the servers 210 of all the edge POPs 120, so that the same location in the distributed data cache 130 is identified for each query regardless of which edge POP 120 receives the query. In other embodiments, the cache manager 260 uses another suitable method to identify a location in the distributed data cache 130 and determine 320 whether the location in the distributed data cache 130 includes data associated with the query. If the identified location in the distributed data cache 130 does not include data associated with the query, the cache manager 260 communicates the query to a database 150 to retrieve 330 data associated with the query. The query and the retrieved data are then stored 240 in the distributed data cache 130 at the location identified by application of the hash function to the received query.

If the cache manager 260 determines 320 the distributed data cache 130 includes data associated with the received query, the data is retrieved 350 from the distributed data cache 130 and communicated to the requesting application. Hence, the cache manager 260 expedites retrieval of data requested by an application using the distributed data cache 130. Additionally, the cache manager 260 dynamically adds data to the distributed data cache 130 as queries are retrieved. Use of the distributed data cache 130 is further described below in conjunction with FIGS. 4A, 4B and 5.

FIG. 4A is an interaction diagram illustrating use of a distributed data cache 130 in a content delivery network (CDN) 102 for initially retrieving data requested by an executing application, according to one embodiment of the present invention. In other embodiments, different and/or additional steps than those shown in FIG. 4A may be used.

Initially, a first client device 110A transmits 405 a request to execute a distributed application to an edge point of presence (POP) 120 of the CDN 102. In one embodiment, an application mapper 240 and an edge point of presence domain name server (POP DNS) 230 in the server of the edge POP 120 receiving the request selects 410 a VIP 225, or other virtual network address, of a server 210 in an edge POP 120 to be used to execute the requested application on a server 210 in the edge POP 120. In one embodiment, the application mapper 240 calculates a score for a plurality of VIPs 225 of the various servers 210 of the multiple edge POPs and uses the score to select 410 a VIP 225 of a particular server 210 in a particular edge POP 120 via which the application should be executed. The selected VIP 225 for application execution may be a VIP 225 included in a server 210 in the same edge POP 120 as the server 210 that received the request or could be a VIP included in a server 210 in a different edge POP 120 of the CDN 102. Selection of a VIP 225 is further described below in conjunction with FIG. 6.

The application mapper 240 communicates the selected VIP 225 to the POP DNS 230 which transmits 415 the selected VIP 225 to the first client device 110A, which then requests 420 execution of the application via the selected VIP 225 of the selected server 120 of the selected edge POP 120. While FIG. 4A illustrates the edge POP 120 as a single entity 120, this is merely for illustration and the edge POP 120 for executing the application via the selected VIP 225 may be different from the edge POP 120 that receives the initial request 405 for application execution as explained above. The sever 120 in the edge POP 120 associated with the selected VIP 225 then requests 425 the application from an application source 160, such as an origin server. The application source 160 transmits 430 the application to the selected VIP 225. In one embodiment, the application source 160 transmits 430 a virtualized instance of the application including executable files associated with the application as well as data files, such as system libraries, used during execution of the application. Resources in the server 210 including the selected VIP 225 are then provisioned 435 to allow execution of the application via the selected VIP 225 in a host 220 in the server 210 using the data received from the application source 160. For example, the server 210 associated with the selected VIP 225 may generate configuration information to appropriately configure a host 220 for execution of the application via the selected VIP 225. In an embodiment, provisioning 425 may also include removing previously executed applications from the server 210 associated with the selected VIP 210 to provide resources for the requested application.

During execution 440 by the selected server 210 via the selected VIP 225, the application generates a query requesting data from a database 150. The query is communicated to a cache manager 260 which checks 445 the distributed data cache 130 for data associated with the query by using the query to identify a location in the distributed data cache 130 that is checked 445 for data. In one embodiment, the cache manager 260 applies a hash function to the query and uses the hash value to identify a location in the distributed data cache 130 that is checked 445 for data associated with the query. For example, the hash value identifies a location in a computer-readable storage medium included in a server 210 in an edge POP 120 which is checked 445 for data associated with the query. While FIG. 4A shows an embodiment where the cache manager 260 is included in the same edge POP 120 that includes the VIP 225 via which the application is executed, in other embodiments, the cache manager 260 may be included in a different edge POP 120.

In the example of FIG. 4A, the distributed data cache 130 does not include data associated with the query, so the cache manager 260 transmits 450 the query to the distributed data cache 130 and also transmits 455 the query to the database 150. Data associated with the query is retrieved from the database 150 and transmitted 460 to the distributed data cache 130, which stores 465 the query from the cache manager 260 together with the data received from the database 150 corresponding to the query. In one embodiment, the query and the data associated with the query are stored 465 in a location in the distributed data cache 130, such as an address in a computer-readable storage medium in a server 210, identified by the query. For example, the cache manager 260 applies a hash function to the received query and uses the resulting hash value to identify the location in the distributed data cache 130 where the query and corresponding data are to be stored 465. In one embodiment, the location in the distributed cache 130 where the query and retrieved data are stored 465 may be in the server on which the application is executed 440. In another embodiment, the location in the distributed cache 130 where the query and retrieved data are stored 465 may be in another server of the same edge POP where the server running the application is located. In still another embodiment, the location in the distributed cache 130 where the query and retrieved data are stored 465 may be in another server of an edge POP different and physically remote from the edge POP including the server running the application.

The data retrieved from the database 150 is also transmitted 470 by the cache manager 260 to the server 210 executing the application, which generates a result from the received data that is transmitted 475 to the first client device 110A.

FIG. 4B is an interaction diagram illustrating use of a distributed data cache 130 in a content delivery network (CDN) 102 for retrieval of previously requested data for an executing application according to one embodiment of the present invention. In other embodiments, different and/or additional steps than those shown in FIG. 4B may be used.

In the embodiment of FIG. 4B, a second client device 110B requests 402 execution of a distributed application by an edge point of presence (POP) 120. An application mapper 240 and an edge point of presence domain name server (POP DNS) 230 in the server 210 of the edge POP 120 receiving the request 405 selects 407 a VIP 225, or another virtual network address, of a server 210 in an edge POP 120 to be used to execute the requested application on a server 210 in the edge POP 120, similar to step 405 shown in FIG. 4A and as explained below in further detail with reference to FIG. 6.

The selected VIP 225 is transmitted 412 to the second client device 110B, which then requests 417 execution of the application on the server 210 associated with the selected VIP 225. Responsive to receiving the request for application execution, the server 210 associated with the selected VIP 225 requests 422 the application from an application source 160, such as an origin server. For purposes of illustration, FIG. 4B shows an embodiment where the selected VIP 225 is included in the edge POP 120 that received the initial application request; however, in other embodiments, the selected VIP 225 may be included in a different edge POP 120 than the edge POP 120 that received the initial application request. The application source 160 transmits 427 the application to the selected VIP 225. In one embodiment, a virtualized instance of the application which includes data files, such as system libraries, used during execution of the application in addition to executable files associated with the application is transmitted 427. The server 210 in an edge pop 120 including the selected VIP 225 is then provisioned 432 for application execution using data from the application source 160. For example, the server 210 associated with the selected VIP 225 may generate configuration information for a host 220 to execute the application and transmit and receive data for the application using the selected VIP 225. After provisioning 432, the application is executed 437 on the server 210 via the selected VIP 225. In one embodiment, the server on which the application is executed 437 may be the same server in the same edge POP on which the application was executed 440 resulting in storage 465 of the data and query (see FIG. 4A). In another embodiment, the server on which the application is executed 437 may be a different server in an edge POP different and physically remote from the edge POP including the server on which the application was executed 440 resulting in storage 465 of the data and query (see FIG. 4A).

During execution 437, the application generates a query requesting data from a database 150. Here, the query is assumed to be the same query 455 as the one that resulted in data retrieval 460 from database 150 and storage 465 in the distributed data cache 130 as illustrated in the example of FIG. 4A. The query is communicated from the selected VIP 225 to a cache manager 260 that checks 442 the distributed data cache 130 for data associated with the query. The cache manager 160 may be one that is running on the same server as the server on which the application is executed 437. In one embodiment, the cache manager 260 applies a hash function to the query and checks 442 a location in the distributed data cache 130 identified by the hash value for data associated with the query. For example, the hash value identifies a server 210 network address and an address within a computer-readable storage medium in the identified server 210 in an edge POP 120 which is checked 442 for data associated with the query. Because all cache managers 260 running on the various servers of the multiple edge POPs 120 of the CDN are designed to use the same hash function to identify a cache location for the queries, the same location in the distributed data cache 130 is identified for the same query regardless of which edge POP 120 receives the query. Thus, in step 442, the cache manager 260 would check for the data corresponding to the query at the same location where the cash manager 260 previously stored the retrieved data corresponding to the same query in steps 460,465 of FIG. 4A.

In the example of FIG. 4B, the distributed data cache 130 includes data associated with the query at the location identified by the hash function applied to the query, so data is retrieved 452 from the distributed data cache 130 and transmitted 457 to the cache manager 260, which communicates the data to the application running on the server 210 via the selected VIP 225. For example, a location in a storage device of a server 210 of an edge POP 120 identified by the cache manager 260 may include the query and data associated with the query, so the data is retrieved 452 from the identified location and transmitted 457 to the cache manager 260. As explained above, the distributed data cache 130 is logically one entity but physically distributed across multiple servers 210 of multiple edge POPs 120 of the CDN 102, so data may be retrieved 452 from a storage device in a server 210 that may be the same as or different from the server 210 running the application via the selected VIP 225. After receiving the data from the distributed data cache 130, the application generates a result that is transmitted 462 to the second client device 110B.

As shown in FIG. 4B, the distributed data cache 130 simplifies data retrieval by an executing application by reducing the number of connections between the server 210 executing the application and a database 150. Because the distributed data cache 130 stores data corresponding to a database query previously made by an application, data corresponding to the same database query can be retrieved from the distributed data cache 130 rather than accessing the database again, thereby reducing network latency by minimizing the amount of data transmitted from the database 150. This is applicable even when different client devices, such as the client devices 110A and 110B make the database query using the same application.

Such features are useful in a CDN service servicing many modern websites, especially Web 2.0 sites that serve a large amount of dynamic content. Such websites require an application to frequently access a database. Because the database is typically stored at or close to the origin server, every query by the application incurs a latency overhead of traversing the network. As a result, origin load and network latency, and hence, the response time are increased. This problem is exacerbated when many users access the website in a short period of time. However, with the distributed data cache 130 according to the embodiments herein, such problems are alleviated.

For example, a user of an on-line shopping website may look for a pair of men's jeans of a particular color and size by using a client device 110A to access a website serviced by a server 210 of an edge POP 120. Data (e.g., price, images, product information) corresponding to the query (men's jeans of a particular color and size) may be retrieved from the origin database and stored in the distributed data cache 130 as illustrated in the example of FIG. 4A if the query is an initial one with no corresponding data stored in the distributed data cache 130. Subsequently, if another user accesses the same website, likely serviced by a different server 210 of a different edge POP 120 and likely using a different client device 110B, and looks for the same item (i.e. the application running on the website issues the same query), the data can now be retrieved from the distributed data cache 130 as illustrated in the example of FIG. 4B rather than accessing the data from the origin database, thereby reducing response time.

Another example is a user logging on to a social networking website, again serviced by a server 210 of an edge POP 120 of the CDN 102. When the user logs in to the social networking website using a log-in ID (i.e., the query) using a client device 110A, the user's profile (i.e., the data corresponding to the query) may be fetched from the backend database of the origin and stored in the distributed data cache 130 as illustrated in the example of FIG. 4A if the query (log-in) is an initial one with no corresponding data (user profile) stored in the distributed cache 130. Subsequently, if the user logs off and then tries to log on to the social networking website again using the same log-in ID (i.e., the same query), using the same client computer 110A or a different client computer 110B, the user profile can be retrieved from the distributed data cache 130 as illustrated in the example of FIG. 4B rather than accessing the data from the origin database again, thereby reducing response time. Clearly, when a website serviced by a server 210 of the CDN 102 receives the same query multiple times and when the accessed data is strictly read-only, a tremendous benefit can be reaped by caching both the query and the result in a distributed data cache 130 spread across the servers 210 of the edge POPs 120.

Figure 5:
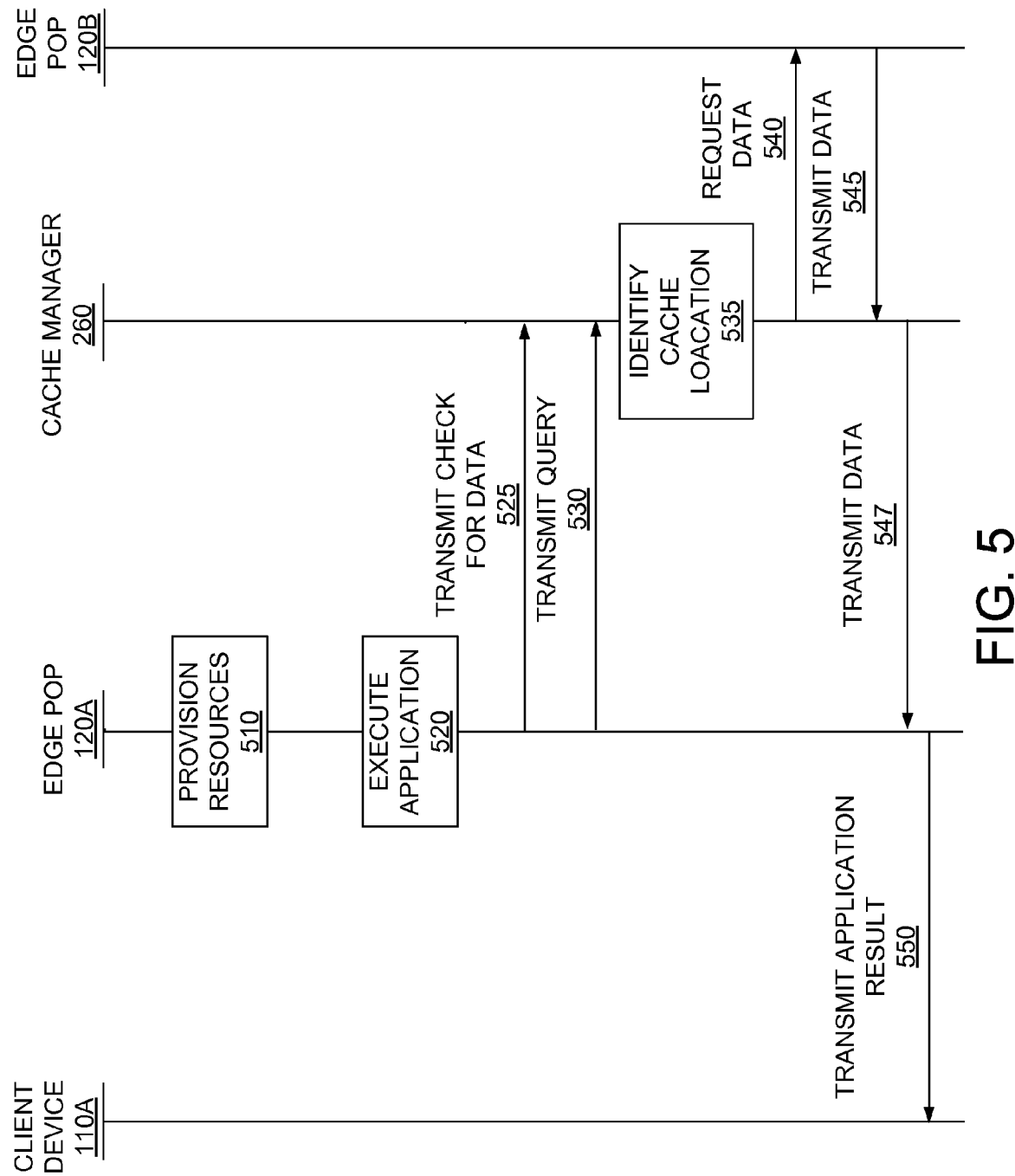
FIG. 5 is an interaction diagram illustrating retrieval of data from a distributed data cache in a CDN in accordance with an embodiment of the present invention.

FIG. 5 is an interaction diagram illustrating retrieval of data from a distributed cache 130 in a CDN 102 in more detail, in accordance with an embodiment of the present invention. To illustrate data retrieval from the distributed data cache 130, FIG. 5 depicts an embodiment where a client device 110A requests application execution on a server 210 within a first edge POP 120A via a VIP 225 that has previously been selected as described above in conjunction with FIGS. 4A and 4B.

Resources in the server 210 in the first edge POP 120 that includes the selected VIP 225 is provisioned 510 as described above in conjunction with FIGS. 4A and 4B and the application previously requested by the client device 110A is executed 520. During execution 520, the application generates a query for data, causing transmission 525 of a request to check the distributed data cache 130 to the cache manager 260. The query is also transmitted 530 to the cache manager 260. Although shown in FIG. 5 as a separate component, the cache manager 260 may be included in the same edge POP 120A as the selected VIP 225 or may be included in a different edge POP 120 than the selected VIP 225.

Responsive to receiving the query and the request, the cache manager 260 identifies 535 a location in the distributed data cache 130 to check for data associated with the query. In one embodiment, the cache manager 260 applies a hash function to the received query to generate a hash value identifying a server 210 and a location in a computer-readable storage device included in the identified server 210. For example, the hash function identifies a network address of a server 210 and a memory address within the server 210. The cache manager 260 requests 540 data associated with the query from the identified location in the distributed data cache 130. In the example of FIG. 5, the identified location in the distributed data cache 130 may be in a server 210 of an edge POP 120B different from edge POP 120A, although in other embodiments the identified location in the distributed data cache 130 may be in a server 210 of the same edge POP 120A. For example, the cache manager 260 transmits a data retrieval request to the identified server 210 in edge POP 120B that contains the identified portion of the distributed cache 130. In the embodiment shown by FIG. 5, the identified cache location corresponds to a server 210 included in a second edge POP 120B, so the cache manager 260 requests 540 the data from the second edge POP 120B, which communicates the request to the server 210 within the second edge POP 120B.

Data associated with the query is retrieved from the location in the distributed data cache 130 within the second edge POP 120B and transmitted 545 from the second edge POP 120B to the cache manager 260, which transmits 547 the data to the first edge POP 120A including the selected VIP 225 via which the application is executed. The server 210 associated with the selected VIP 225 continues executing the application using the retrieved data and transmits 550 a result based on the received data to the client device 110A.

As described above in conjunction with FIG. 1, the distributed data cache 130 is divided across multiple servers 210 across multiple edge POPs 120 of the CDN 102 in order to simplify access to the stored data and expansion of the distributed data cache 130. FIG. 5 illustrates an example of how the cache manager 260 provides applications with a single logical view of the distributed data cache 130 by directing received queries and retrieved data between a first edge POP 120A and a second edge POP 120B. The cache manager 260 may also route data requests and retrieved data between various servers 210 within a single edge POP 120A. Hence, the cache manager 260 identifies a location within the distributed data cache 130 associated with a query and communicates data from the identified location within the distributed data cache 130 to the requesting application. The location within the distributed data cache 130 identified in step 535 may be the server 210 that is executing the application, may be a different server 210 within the same edge POP 120 as the server 210 executing the application, or may be a server 210 in a different (physically remote) edge POP 120 than the server 210 executing the application.

Figure 6:
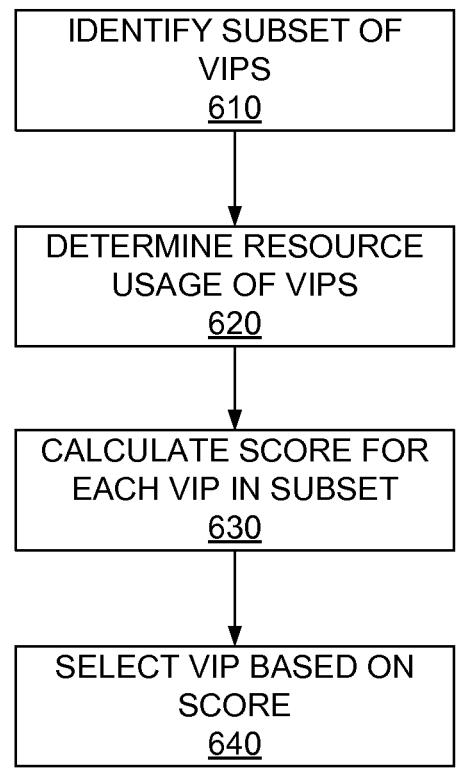
FIG. 6 is a flow chart of a method for selecting a virtual internet protocol address (VIP) on a host system of a server in an edge point of presence (POP) in a content delivery network (CDN) to execute an application in accordance with an embodiment of the present invention.

FIG. 6 is a flow chart of a method for selecting 410 a virtual Internet Protocol address (VIP) 225 of the server of an edge point of presence (POP) 120 in a content delivery network (CDN) 102 via which an application is executed in accordance with an embodiment of the present invention. In one embodiment, the steps of the method shown in FIG. 6 are performed by an edge point of presence domain name server (POP DNS) 230 and an application mapper 240 executed on a server 210 within an edge POP 120.

After receiving a request from a client device 110 to execute an application, the POP DNS 230 uses a load balancing algorithm to identify 610 a subset of VIPs 225 optimizing one or more criteria, such as access time. In one embodiment, the POP DNS 230 receives data describing the status of multiple VIPs 225 and the status of a network connecting the servers of various edge POPs 120 from one or more probes 250. As described above in conjunction with FIG. 2B, a probe 250 measures the load on various servers 210 and their network status to describe the VIP 225 status. In one embodiment, the probe 250 communicates processor usage, memory usage, available storage space and number of network connections of a server 210 including one or more VIPs 225 to the POP DNS 120. A probe 250 may also determine network status by measuring latency and bandwidth between edge POPs 120 and client devices 110. Using the network status and server use data from the probe 250, the POP DNS 230 identifies 610 the subset of VIPs 225 based on the status of VIPs 225, the latency between various edge POPs 120 and the client device 110 requesting application execution, bandwidth available to various VIPs 225, availability of various POPs 120 and/or packet loss characteristics. In one embodiment, the POP DNS 230 uses additional criteria when identifying 610 the subset of VIPs 225.

The resource manager 270 then determines 620 resource usage of applications executed on the servers associated with the identified subset of VIPs. While the POP DNS 130 identifies 610 the subset of VIPs 225 based on physical-level server 210 resource usage, the resource manager 270 determines 620 how various applications executed on the servers 210 associated with the identified VIPs 224 use server resources based on data captured from executing applications. For example, the resource manager 270 may determine whether the executing applications are computationally intensive or use specialized instructions, frequently access storage devices and/or communicate with external entities, such as other applications, other systems or other client devices 110. Determining application-level resource usage allows the resource manager 270 to generate a status map describing how various applications executed use resources of the server 210 including the identified VIPs 225.

Using physical-level resource use from the POP DNS 230 and application-level resource use from the resource manager 270, the application mapper 240 calculates 630 a score for each VIP 225 in the identified subset 610. In one embodiment, the application mapper 240 calculates 630 a VIP-specific score by combining VIP 225 application-level resource usage from the resource manager 270, VIP 225 physical-level resource usage from the POP DNS 230 and network distance, or geographic distance, from the edge POP 120 including the VIP 225 to the client device 110 requesting the application. The application mapper 240 may also multiply the combination of VIP 225 application-level resource usage, VIP 225 physical-level resource usage and network or geographic distance from VIP 225 to client device 110 by a weight, or may associate different weights with different data and then combine the weighted data.

The application mapper 240 then selects 640 a VIP 225 from the subset of VIPs 225 based on the score associated with each VIP 225. For example, the application mapper 240 selects 640 the VIP 225 associated with the lowest score. In one embodiment, the application mapper 240 ranks the VIPs 225 within the subset of VIPs 225 based on the score associated with each VIP 225 and selects 640 a VIP 225 based on the ranking of the VIP 225.

Example Server Architecture

Figure 7:
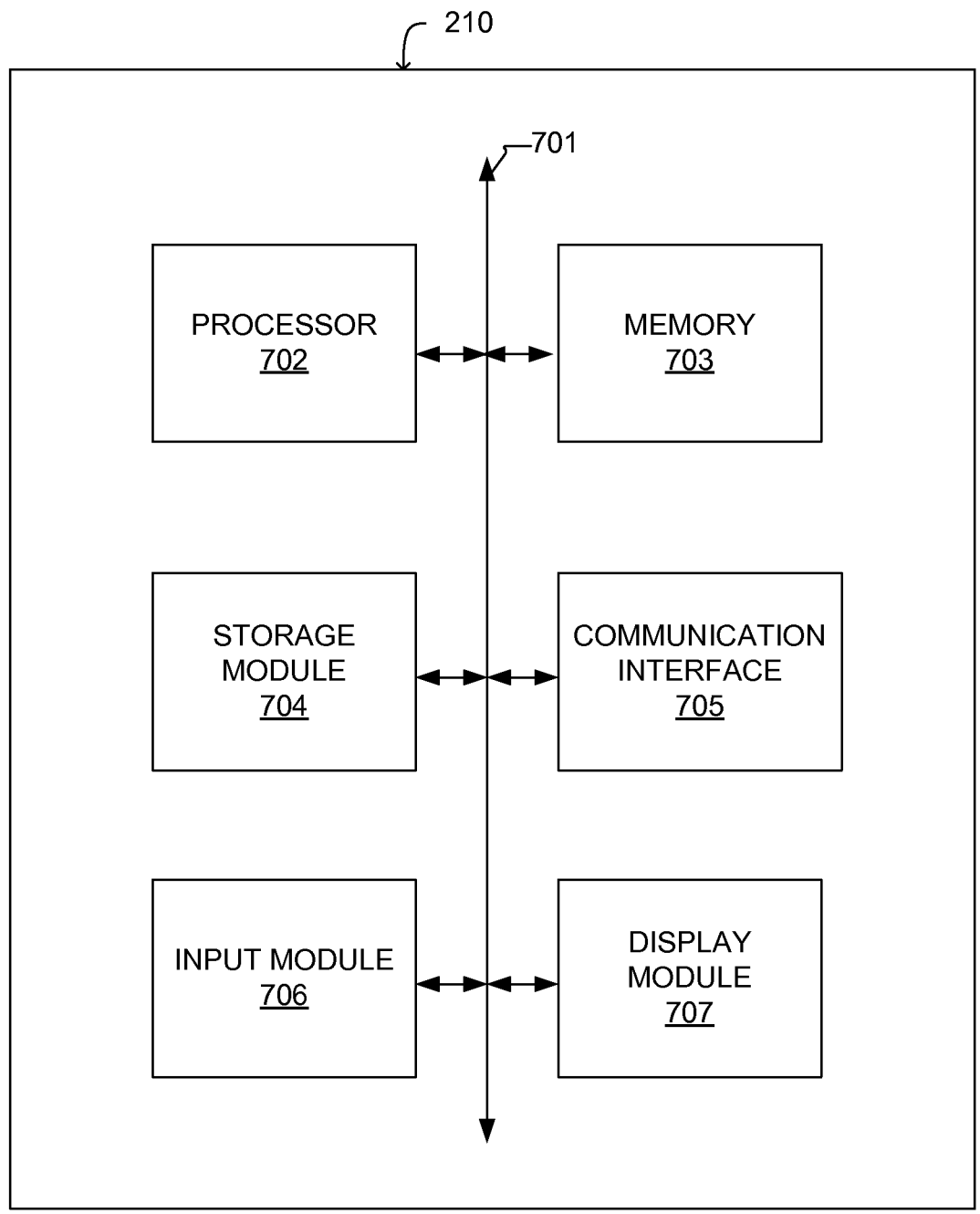
FIG. 7 shows the hardware architecture of a cache server, in accordance with an embodiment of the present invention.

FIG. 7 illustrates the hardware architecture of a server 210, according to one embodiment of the present invention. In one embodiment, the server 210 is a server computer including components such as a processor 702, a memory 703, a storage module 704, an input module (e.g., keyboard, mouse, and the like) 706, a display module 707 and a communication interface 705, exchanging data and control signals with one another through a bus 701. The storage module 704 is implemented as one or more computer readable storage media (e.g., hard disk drive), and stores software that is run by the processor 702 in conjunction with the memory 703 to implement the distributed data cache 130 and other functionality as described herein. Operating system software and other application software may also be stored in the storage device 704 to run on the processor 702. Note that not all components of the server 210 are shown in FIG. 7 and that certain components not necessary for illustration of the present invention are omitted herein.

Figure 8:
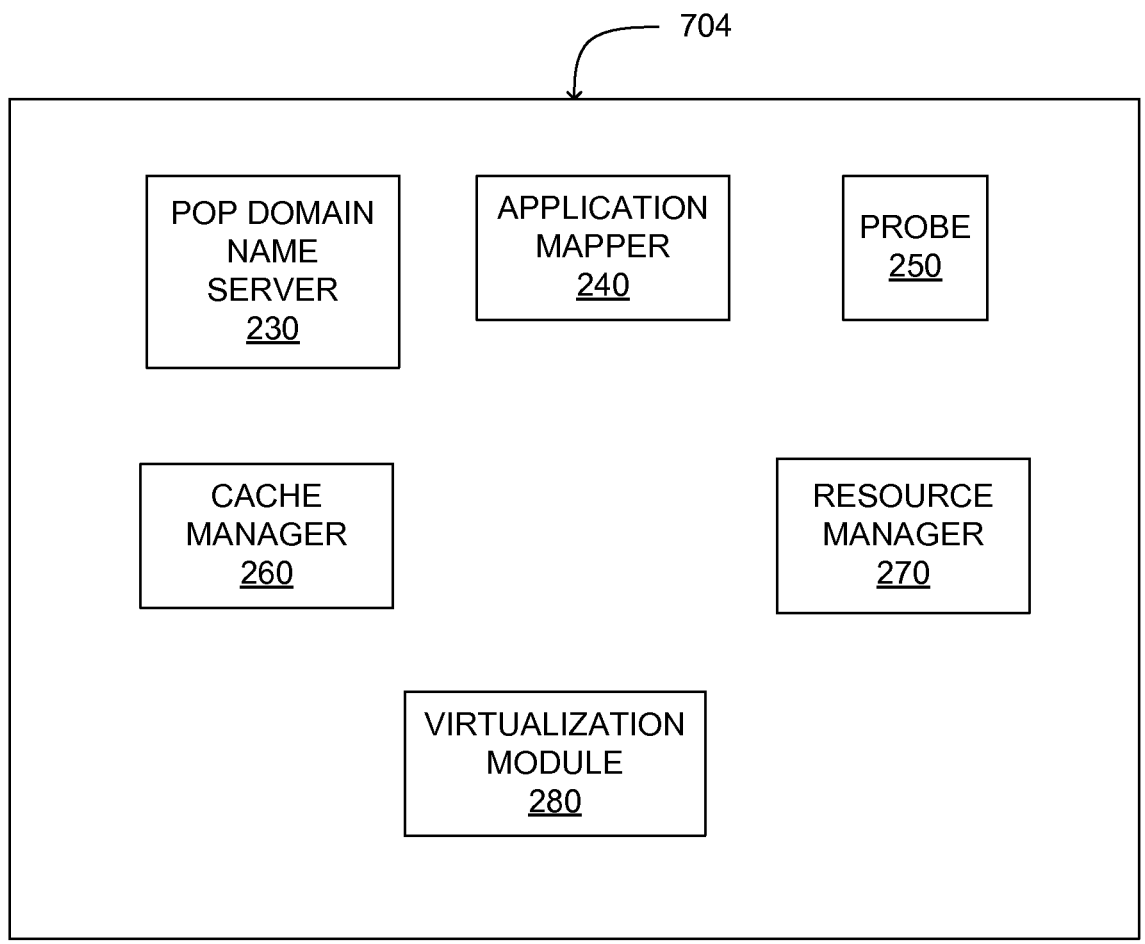
FIG. 8 shows a storage module of a cache server storing various functional software modules, in accordance with an embodiment of the present invention.

FIG. 8 illustrates the storage module 704 of a server 210 storing various software modules for execution by the server 210, including a POP domain name server 230, an application mapper 240, a probe 250, a cache manager 260, a resource manager 270 and a provisioning module 280.

As can be seen from the description above, the embodiments herein improve data retrieval time for applications executed using a CDN 102. A distributed data cache 130 stores data retrieved from a database 150 and the corresponding queries used for data retrieval, allowing data to be retrieved from the distributed data cache 130 rather than from the database 150 when the same query is subsequently issued by the applications. The distributed data cache 130 is spread across multiple computer-readable storage media included in multiple servers 210, possibly across multiple edge POPs of the CDN, allowing convenient scaling of the distributed data cache 130 and more efficient access to the distributed data cache 130 from multiple locations. One or more edge points of presence (POPs) 120 in the CDN 102 execute cache mangers 260 to communicate queries to the distributed data cache 130 and to communicate data from the distributed data cache 130 to the applications. The one or more cache managers 260 allow the distributed data cache 130 to appear as a single logical entity to various applications, simplifying access.

Upon reading this disclosure, those of skill in the art will appreciate still additional alternative designs for providing rapid data retrieval through a CDN. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a content delivery network including a plurality of servers included in one or more edge points of presence (edge POPs), a computer-implemented method comprising:
    receiving a request from a client device to execute an application running on a first one of the servers of a first one of the edge POPs of the content delivery network;
    selecting, by the first one of the edge POPs, a virtual network address from a plurality of virtual network addresses associated with a host system running on the first one of the servers within the first one of the edge POPs;
    executing the requested application on the first one of the servers via the selected virtual network address;
    receiving a query for data from the application running on the first one of the servers;
    retrieving data corresponding to the query from a data source external to said first one of the servers; and
    storing the query together with the data corresponding to the query at a location in a computer-readable storage medium in the first one of the servers on which the application is running.

2. The method of claim 1, further comprising:
    storing the query and the data corresponding to the query at a location in a distributed data cache determined by the query, the distributed data cache distributed across computer-readable storage media included in the plurality of servers.

3. The method of claim 1, further comprising:
    applying a hash function to the query to generate a hash value associated with the query; and
    identifying a location in the computer-readable storage medium included in the first one of the servers, the location identified by the hash value, the query and the data associated with the query being stored at the location identified by the hash function in the computer-readable storage medium.

4. The method of claim 1, wherein the query and the data are further stored at a location in a computer-readable storage medium in a second one of the servers of the first one of the edge POPs.

5. The method of claim 1, wherein the query and the data are further stored at a location in a computer-readable storage medium in a second one of the servers of a second one of the edge POPs physically remotely located from the first one of the edge POPs.

6. The method of claim 1, wherein executing the application on the first one of the servers via the selected virtual network address comprises:
    receiving a virtualized instance of the application including executable data associated with the application as well as data files used during execution of the application;
    provisioning the selected virtual network address for executing the application; and
    executing the application.

7. The method of claim 1, wherein storing the query together with the data corresponding to the query comprises:
    responsive to determining the computer-readable storage medium is full, deleting a least recently accessed query and data associated with the least recently accessed query from the computer-readable storage medium; and
    storing the query and the data corresponding to the query in the computer-readable storage medium.

8. The method of claim 1, wherein storing the query together with the data associated with the query comprises:
    responsive to determining the computer-readable storage medium is full, deleting a least frequently accessed query and data associated with the least frequently accessed query from the computer-readable storage medium; and
    storing the query and the data corresponding to the query in the computer-readable storage medium.

9. The method of claim 1, further comprising:
    receiving the same query from the application;
    determining whether the computer-readable storage medium stores data corresponding to the same query; and
    responsive to determining that the computer-readable storage medium stores data corresponding to the same query, retrieving the data associated with said same query.

10. The method of claim 9, wherein determining whether the computer-readable storage medium stores data corresponding to the same query comprises:
    applying a hash function to the same query to generate a hash value associated with the query;
    identifying a location in the computer-readable storage medium included in the first one of the servers, the location identified by the hash value; and
    determining whether the computer-readable storage medium stores the data corresponding to the query at the identified location.

11. The method of claim 9, wherein same query is received from the application running on said first one of the servers of said first one of the edge POPs of the content delivery network.

12. The method of claim 9, wherein the same query is received from the application running on a second one of the servers of a second one of the edge POPs physically remotely located from the first one of the edge POPs.

13. The method of claim 1, wherein the query and the data corresponding to the query are further stored together in a distributed data cache that is distributed across the servers of a plurality of edge POPs.

14. A server of a content delivery network including at least a processor and a non-transitory computer readable storage medium storing computer instructions configured to cause the processor to perform a computer-implemented method of retrieving data, the method comprising:
    receiving a request from a client device to execute an application running on a first one of the servers of a first one of the edge POPs (points of presence) of the content delivery network;
    selecting, by the first one of the edge POPs, a virtual network address from a plurality of virtual network addresses associated with a host system running on the first one of the servers within the first one of the edge POPs;
    executing the application on the first one of the servers via the selected virtual network address;
    receiving a query for data from the application running on the first one of the servers;
    retrieving data corresponding to the query from a data source external to said first one of the servers; and
    storing the query together with the data corresponding to the query at a location in a computer-readable storage medium in the first one of the servers on which the application is running.

15. The server of claim 14, wherein the method further comprises:
    storing the query and the data corresponding to the query at a location in a distributed data cache determined by the query, the distributed data cache distributed across computer-readable storage media included in the plurality of servers.

16. The server of claim 15, wherein the location in a computer-readable storage medium is in a second one of the servers of a second one of the edge POPs physically remotely located from the first one of the edge POPs.

17. A non-transitory computer readable storage medium storing a computer program product including computer instructions configured to cause a processor of a computer to perform a computer-implemented method of retrieving data from a content delivery network, the method comprising:
    receiving a request from a client device to execute an application running on a first one of the servers of a first one of the edge POPs (points of presence) of the content delivery network;
    selecting, by the first one of the edge POPs, a virtual network address from a plurality of virtual network addresses associated with a host system running on the first one of the servers within the first one of the edge POPs;
    executing the application on the first one of the servers via the selected virtual network address;
    receiving a query for data from the application running on a first one of the servers;
    retrieving data corresponding to the query from a data source external to said first one of the servers; and
    storing the query together with the data corresponding to the query at a location in a computer-readable storage medium in the first one of the servers on which the application is running.

18. The non-transitory computer readable storage medium of claim 17, wherein the method further comprises:
    storing the query and the data corresponding to the query in a location in a distributed data cache determined by the query, the distributed data cache distributed across computer-readable storage media included in the plurality of servers.

19. The non-transitory computer readable storage medium of claim 18, wherein the location in the computer-readable storage medium is in a second one of the servers of a second one of the edge POPs physically remotely located from the first one of the edge POPs.

20. The non-transitory computer readable storage medium of claim 17, further comprising:
    receiving the same query;
    determining whether the computer-readable storage medium stores data corresponding to the same query; and
    responsive to determining that the computer-readable storage medium stores data corresponding to the same query, retrieving the data associated with said same query.

21. The non-transitory computer readable storage medium of claim 20, wherein the same query is received from the application running on a second one of the servers of a second one of the edge POPs physically remotely located from the first one of the edge POPs.

* * * * *